(12) United States Patent
Bormann et al.

(10) Patent No.: US 10,002,698 B2
(45) Date of Patent: Jun. 19, 2018

(54) VALVE HAVING A MAGNETIC ACTUATOR

(71) Applicant: Robert Bosch GmbH, Stuttgart (DE)

(72) Inventors: Axel Bormann, Bamberg (DE);
Thorsten Bauer, Memmelsdorf (DE);
Juergen Graner, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 10 days.

(21) Appl. No.: 14/714,893

(22) Filed: May 18, 2015

(65) Prior Publication Data

US 2015/0332833 A1    Nov. 19, 2015

(30) Foreign Application Priority Data

May 16, 2014  (DE) .................... 10 2014 209 384

(51) Int. Cl.
| | | |
|---|---|---|
| *B23P 15/00* | (2006.01) | |
| *H01F 7/08* | (2006.01) | |
| *F16K 31/08* | (2006.01) | |
| *F02M 51/06* | (2006.01) | |
| *F02M 61/16* | (2006.01) | |

(Continued)

(52) U.S. Cl.
CPC ............ *H01F 7/081* (2013.01); *B23P 15/001* (2013.01); *F02M 51/0671* (2013.01); *F02M 61/168* (2013.01); *F16K 31/0675* (2013.01); *F16K 31/08* (2013.01); *H01F 7/1607* (2013.01); *F01N 2610/02* (2013.01); *F01N 2610/1453* (2013.01); *F02M 2200/08* (2013.01); *F02M 2200/8069* (2013.01); *F02M 2200/8084* (2013.01); *H01F 2007/086* (2013.01); *Y10T 29/49407* (2015.01)

(58) Field of Classification Search
CPC .. H01F 7/081; H01F 7/1607; H01F 2007/086; H01F 2007/085; F16K 31/0675; F16K 31/08; F02M 61/168; F02M 51/0671; F02M 2200/8084; F02M 2200/8069; F02M 2200/08; F01N 2610/02; F01N 2610/1453; Y10T 29/49407; B23P 15/001
See application file for complete search history.

(56) References Cited

U.S. PATENT DOCUMENTS

| | | | | |
|---|---|---|---|---|
| 7,877,877 B2 * | 2/2011 | Reiter | ..................... | B21C 37/06 138/171 |
| 8,186,379 B2 * | 5/2012 | Murayama | .......... | F16K 31/0675 137/554 |

(Continued)

FOREIGN PATENT DOCUMENTS

DE    102006021741    11/2007

*Primary Examiner* — Ian Paquette
(74) *Attorney, Agent, or Firm* — Norton Rose Fulbright US LLP; Gerard Messina

(57) ABSTRACT

A magnetic actuator, which is used particularly for devices of internal combustion engines, includes a magnetic coil and at least one ferromagnetic component. In this instance, a magnetic flux caused by the magnetic coil is able to be guided via the component. On ferromagnetic component, a magnetic choke point is provided, which is used to adjust the magnetic flux. The magnetic choke point may be formed by a local microstructural modification of a ferromagnetic material of the ferromagnetic component. Furthermore, a valve having such a magnetic actuator and a method for producing such a magnetic actuator are indicated.

7 Claims, 4 Drawing Sheets

(51) Int. Cl.
*F16K 31/06* (2006.01)
*H01F 7/16* (2006.01)

(56) References Cited

U.S. PATENT DOCUMENTS

| | | | | |
|---|---|---|---|---|
| 8,245,402 | B2* | 8/2012 | Seitter | B23P 15/001 |
| | | | | 228/178 |
| 8,851,450 | B2* | 10/2014 | Mizobe | H01F 7/081 |
| | | | | 251/129.15 |
| 2008/0210896 | A1* | 9/2008 | Bohn | B60T 8/36 |
| | | | | 251/129.02 |
| 2011/0147493 | A1* | 6/2011 | Mitsuoka | B23K 26/36 |
| | | | | 239/533.2 |
| 2014/0224903 | A1* | 8/2014 | Fujino | F02M 51/0664 |
| | | | | 239/585.1 |

* cited by examiner

VALVE HAVING A MAGNETIC ACTUATOR

FIELD OF THE INVENTION

The present invention relates to a magnetic actuator which is used particularly for devices of internal combustion engines, and a valve having such a magnetic actuator as well as a method for producing such a magnetic actuator. The present invention especially relates to the field of fuel injection systems of internal combustion engines.

BACKGROUND INFORMATION

An injector for injecting fuel into a combustion chamber of an internal combustion engine is known from German Published Patent Application No. 10 2006 021 741, in which a control valve is actuated via a magnet. As soon as the magnet has current applied to it, a magnetic field is formed which acts upon an armature. In this connection, the armature is accommodated in an armature chamber, in which fuel flows out of a control chamber when the control valve is open. In order to start an injection process, the magnet has current applied to it, and in order to end the injection process, the supply of current to the magnet is ended.

In a magnetic switching valve, such as is known from German Published Patent Application No. 10 2006 021 741, there is the problem that its production results in tolerances for the switching behavior of the magnetic switching valve or rather for the magnetic attraction force acting on the armature, which are costly to reduce by tight tolerance specifications. Of particular importance in this connection is the air gap on the armature resulting from the geometric tolerances as well as variances in the magnetic properties of the individual components. Such production variances result in functional variances, producing, for example, in variances in the dynamic metering quantity. If necessary, such variances may be countered by charge-by-charge adjustment of the residual air gap. However, because of construction costs, an individual adjustment is frequently not possible.

SUMMARY

The magnetic actuator according to the present invention, the valve according to the present invention, and the method according to the present invention have the advantage that a better embodiment and mode of operation are made possible. In particular, a tolerance-related variance in the switching behavior is able to be reduced.

The magnetic actuator has the ferromagnetic component on which a magnetic choke point is provided, which is used for adjusting the magnetic flux. In this case, at least one such magnetic choke point is provided. Consequently, a plurality of magnetic choke points may also be provided, which are used to adjust the magnetic flux, in case this is expedient in the respective case of application. The ferromagnetic component for the magnetic actuator may be implemented in different ways. In one possible embodiment, the magnetic actuator, as a stand-alone product, may already include the ferromagnetic component and may be produced and sold independently of the equipment into which it will be installed. In another possible embodiment, the ferromagnetic component of the magnetic actuator may be formed by a housing part of the equipment, into which the magnetic coil, the armature and possibly additional components for the magnetic actuator are fitted in. The ferromagnetic component of the magnetic actuator may thus especially also be formed by an housing part of a valve housing of a valve, the magnetic actuator thus designed being used for switching the valve. In this case the magnetic actuator is operational only after the assembly of the valve.

It is advantageous that at least one magnetic choke point is formed by a local microstructural transformation of a ferromagnetic material of the ferromagnetic component. In this case, it is especially advantageous that the magnetic choke point is formed by an austenitic microstructure of the ferromagnetic material. The material for the ferromagnetic component may be optimized with respect to the magnetic conductivity. By heating, a change in microstructure may be generated in specified material regions, which changes the magnetic properties. In particular, a change in microstructure into an austenitic microstructure is able to change the magnetic properties sufficiently so that the respective effect is usable. If a material is used that is optimized with respect to the magnetic conductivity, then suitable local heating will diminish the magnetic flux at the magnetic choke point thus produced compared to the initial state. This makes it possible to reduce the magnetic flux, whereby the overall properties may be adjusted.

Thus, the magnetic flux is able to be reduced in a controlled manner. In this context, a durable choking of the magnetic flux may be achieved by various approaches. One possibility is a local change in the material properties, such as by local heating, which may be done using a laser, for example.

A further possibility for the controlled reduction of the magnetic flux is a reduction in the component cross section through which the magnetic flux flows. This may be done, for instance, by removing material, which may be achieved using a laser, for instance. However, material may also be removed in other ways.

Thus, it is advantageous that the magnetic choke point is formed by a recess on the ferromagnetic material. Such a recess is preferably developed using a laser beam. The magnetic choke point may be specifically developed by machining the ferromagnetic component using a pulsed laser beam, the laser beam acting on the ferromagnetic component.

For example, the magnetically effective cross section may be reduced in one step by the annular removal of a groove on the ferromagnetic component until a setpoint value is reached for the magnetic flux or rather, a setpoint value for a magnetic force. For this purpose, laser systems are preferably used whose pulse duration is so short that a removal may be achieved without additional thermal damage to the material of the ferromagnetic component. The laser removal may be performed, in this case, using a scanner lens. The laser pulses may be generated in this case as ps laser pulses (picosecond laser pulses) or fs laser pulses (femtosecond laser pulses).

The magnetic actuator may, for instance, be made up of an assembly which includes an armature, a needle, the magnetic coil, a diaphragm and a body. This assembly may be inserted into a device, in order to make possible the simultaneous application of current to the magnetic coil and a measurement of the needle force acting on the needle. The body may be designed as a pole body. Consequently, the actual value of the needle force may be determined, which corresponds to a desired magnetic behavior. From the knowledge of the needle force and the applied current, it is possible to infer the magnetic flux. This makes it possible to adjust the magnetic flux.

A further possibility for embodying the magnetic choke point is by introducing a bead on plate weld seam, via which the magnetic flux is able to be adjusted. Therefore, it is also advantageous that the magnetic choke point is formed by a bead on plate weld seam on the ferromagnetic component.

It is also of advantage that the ferromagnetic component is developed, at least essentially, rotationally symmetrical and that the choke point is developed having a rotationally symmetrical embodiment on the ferromagnetic component. A possibly desired, rotationally symmetrical embodiment of the magnetic field may be ensured thereby, in order to achieve an advantageous switching response.

It is also possible that, on a second ferromagnetic component, at least one magnetic choke point is provided, which is also used to adjust the magnetic flux. This applies correspondingly to further ferromagnetic components. In order to reduce the processing expenditure, however, it will, as a rule, be expedient that exactly one ferromagnetic choke point is provided only on one ferromagnetic component, which is used to adjust the magnetic flux.

The ferromagnetic component, on which the choke point for adjusting the magnetic flux is developed, may be the armature, a hollow body or another component of the magnetic actuator. Thus, with respect to the particular case of application, a suitable component may be processed for adjusting the magnetic flux, and be modified thereby.

The geometrical embodiment and the material-specific properties of the respective component determine the extent to which the respective component promotes a magnetic flux that is as great as possible. Conversely, bottlenecks come about for the magnetic flux, in this connection, at certain components and possibly at certain locations of the components. Such bottlenecks are characterized in that geometrical modifications and/or modifications concerning the material microstructure affect the magnetic flux to a comparatively high degree. At other locations, such modifications may possibly have only a comparatively small effect on the magnetic flux. It is of advantage that, for adjusting the magnetic flux, the magnetic choke point is implemented or rather, produced at a bottleneck for the magnetic flux. The geometrical extension of the modification may thereby be limited. For instance, because of this, a recess on the ferromagnetic component, which forms the magnetic choke point, may be executed to be comparatively small. Other properties, particularly the strength of the component, are not impaired thereby. This is of advantage, for example, in a modification that is undertaken on a component developed as a housing part of a valve housing. If the magnetic choke point is produced by a local microstructural modification, for example, then this makes it possible to reduce the penetration depth into the component. This facilitates the production, reduces the energy applied that is required for the change in microstructure and thereby avoids thermal damage and weakening of the material.

It is also advantageous that the modification of the ferromagnetic component, which is undertaken to develop the magnetic choke point, is undertaken on the end product or on a precursor product in the form of an operational subassembly. This makes it possible to adjust the magnetic flux, for example, by the iterative application of current and measuring the force, as well as by processing the component, in order to set the setpoint value for the magnetic flux or for the magnetic attractive force.

The embodiment of the magnetic choke point, which is used for adjusting the magnetic flux, makes it possible to influence specific properties. Thus, the response behavior of the magnetic circuit may be influenced by the orientation of the modified, or rather removed areas of the material. For example, by a modification which runs transversely to the direction of flow, a choking of the magnetic flux may be achieved in quantitative terms, which changes the maximum magnitude of the closing force. By a modification along the forward direction of the magnetic flux, the build-up of eddy currents may be counteracted, whereby the response behavior over time of the magnetic circuit is influenced. By way of the orientation of the modification and/or by way of the combination of suitable modifications, which is also achievable by a plurality of magnetic choke points, at least one property is thus able to be influenced with respect to the response behavior. Thus, within certain limits, it is possible to influence in a targeted manner particularly, on the one hand, the rise and drop of the magnetic attractive force and thus the closing force and, on the other hand, the maximum value of the closing force achieved when the magnetic coil responds or when it is energized.

When carrying out the method, initially the behavior of the magnetic actuator may be determined for example. Due on the production tolerances, it is possible that the response behavior and the maximum strength of the closing force deviate from their setpoint specifications. From this, modifications may be determined in one possible embodiment of the method, which are subsequently implemented on at least one component. In a further possible embodiment of the method, it is also possible to perform an iterative or a continuous adjustment while iteratively or continuously measuring the actual parameters.

This allows for a method in which the magnetic flux and thus the closing force of the valve may be set in the component and adjusted to a setpoint value, without additional structural components being required. In this connection, depending on the embodiment, the method allows for adjusting essential functional variables of the magnetic actuator or the valve. A dynamic liquid quantity, for example, is one such essential functional variable. Furthermore, a characteristics curve for the regulated valve operation may be stabilized. Thus, the tolerance-based variance around the setpoint properties may be reduced by adjusting all products individually to the magnetic setpoint value.

The method of functioning of the adjustment of the magnetic actuators and/or the valves is based on the change of the respective magnetic circuit at which the magnetic flux is conducted through various components. In this connection, there is always also included one component which chokes the magnetic flux the most. The crux of the adjustment is to produce artificially a magnetic choke point and to strengthen the respective choking effect until the setpoint state is achieved. Using the method, it is possible to decrease the variance of the individual specimens, in the case of comparably precisely produced specimens, or to allow for the use of more cost-effective components having greater tolerances at constant variance of the magnetic force and similar properties.

The valve is preferably used for metering liquids. One preferred area of use is as a high-pressure injection valve or also as a metering device for liquids for exhaust-gas treatment. For this purpose, by applying a current to the magnetic coil, a magnetic circuit is activated, which results in the activation of the valve and thus in a metering action. This magnetic circuit is determined by the components guiding the magnetic flux, in particular, by the air gap at the magnetic armature resulting from geometric tolerances, as well as variances in the magnetic properties of the components. Because of these production variances, the magnetic flux is also always subject to fluctuations, resulting in functional variances, for example, in the dynamic metering quantity. In some valves, a controlled variable is generated, as a functional relationship of applied current or voltage and the closing time of the valve, which is used for actuating the products. In this connection, a low variance of the magnetic circuit is also required, since otherwise the control mechanisms are unfavorably influenced. Because of the magnetic choke point, which is used for adjusting the magnetic flux, the variance in the magnetic circuit is able to be limited to the range required for the actuation or rather, the regulation. The unfavorable influencing of the control mechanisms is thereby prevented. The fluctuations of the magnetic flux generated by the production variances are partially compensated for in this instance, whereby the functional variances, particularly of the dynamic metering quantity, are reduced.

DETAILED DESCRIPTION

Figure 1:
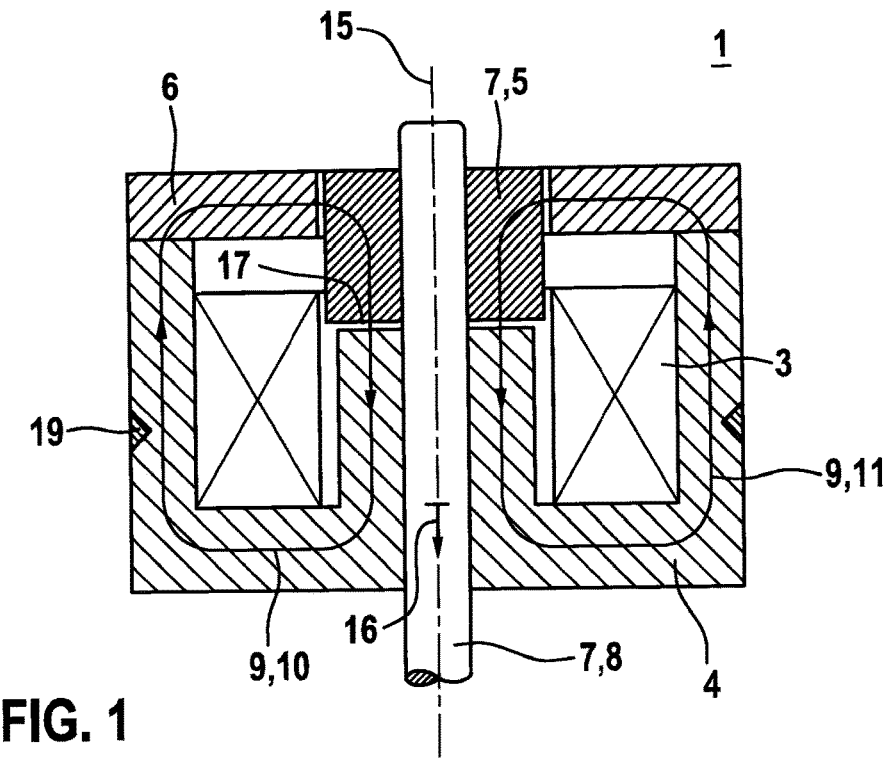
FIG. 1 shows a magnetic actuator corresponding to a first exemplary embodiment of the present invention in a schematic sectional representation.

FIG. 1 shows a magnetic actuator 1, which is used particularly for devices 2 of internal combustion engines. Devices 2 embodied as valves 2 are described with the aid of FIGS. 5 and 6. Magnetic actuator 1 has a magnetic coil 3 and ferromagnetic components 4, 5, 6. Ferromagnetic component 4 is developed in this exemplary embodiment as pole pot 4. Ferromagnetic component 5 is developed in this exemplary embodiment as an armature part 5. Magnetic actuator 1 has an armature 7 which includes armature part 5 and a rod-shaped element 8. Depending on the embodiment of magnetic actuator 1, rod-shaped element 8 may also be a valve needle 8 or another type of operating element 8. By applying current to magnetic coil 3, a magnetic flux 9 is able to be generated, which is illustrated by magnetic field lines 10, 11.

Figure 5:
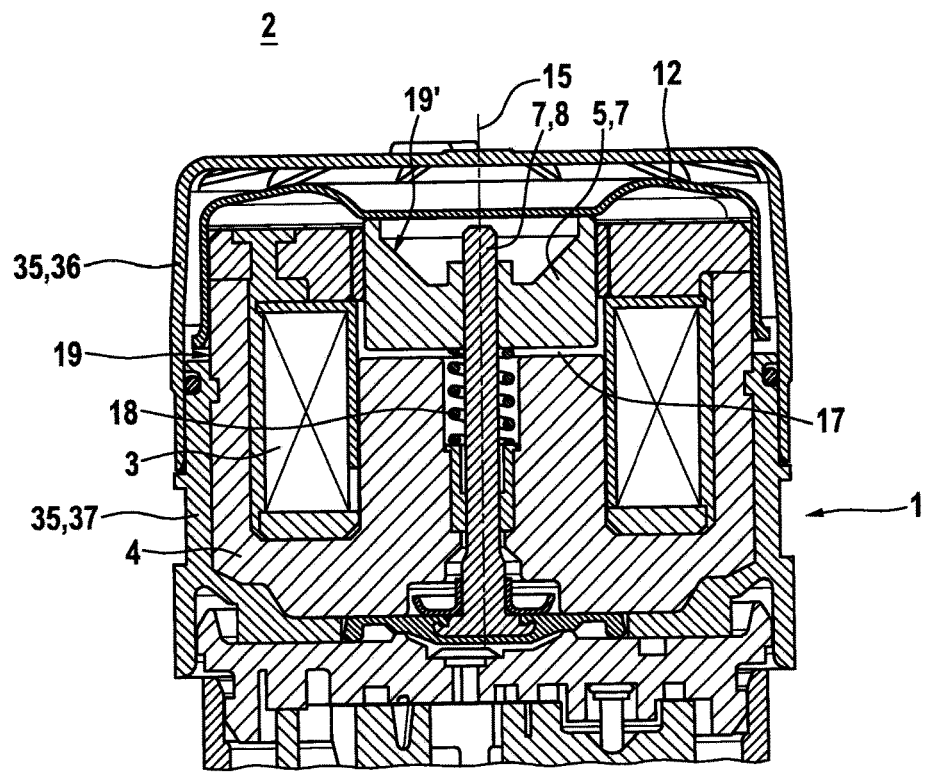
FIG. 5 shows a valve used for metering in an exhaust-gas treatment, having a magnetic actuator corresponding to a possible embodiment of the present invention in an excerpted schematic sectional representation.

Magnetic actuator 1 is preferably at least approximately embodied to be rotationally symmetrical with respect to an axis 15. Armature 7 is adjustable within certain limits along axis 15. This allows for an operation of armature part 5 and rod-shaped element 8 along axis 15 in a direction 16 by applying current to magnetic coil 3. In this exemplary embodiment, an operation of armature part 5 and of rod-shaped element 8 in direction 16 is achieved by applying current to magnetic coil 3. In the process, an air gap 17 is closed between armature part 5 and pole pot 4. The restoring takes place via a suitable component, particularly a spring element 18 (FIG. 5).

Corresponding to magnetic field lines 10, 11, a magnetic circuit is produced, which is closed via ferromagnetic components 4, 5, 6. In the process, armature part 5 is connected to rod-shaped element 8. The production of magnetic actuator 1 results in production variances due to production tolerances. Such production variances may be compensated for, if necessary, within certain limits by adjusting air gap 17. However, this is normally possible only from charge to charge, since an individual adjustment is very costly due to the constructive expenditure required for this purpose.

For the adjustment of magnetic flux 9 with respect to a setpoint magnetic flux, a magnetic choke point 19 is implemented on ferromagnetic component 4. For this purpose, in this exemplary embodiment, the microstructure of a ferromagnetic material of ferromagnetic component 4 is changed on magnetic choke point 19. This structural modification is thus performed locally so as to develop magnetic choke point 19. Magnetic flux 9 is influenced to a greater or lesser degree by way of the size of magnetic choke point 19 or by way of the local extent of the local microstructural modification. In the process, magnetic flux 9 is damped to a greater or lesser degree with respect to the initial state, in which the ferromagnetic material is still unaffected. In this exemplary embodiment, magnetic choke point 19 may be developed by local heating. The local extension of magnetic choke point 19 may be influenced particularly via the quantity of energy introduced for local heating. For this purpose, the heat quantity introduced may be predetermined, or it may be determined by iterative or continuous measurement of an actual variable, particularly a magnetic attractive force.

Magnetic choke point 19 may, for instance, be formed by an austenitic structure 19 of the ferromagnetic material.

Figure 2:
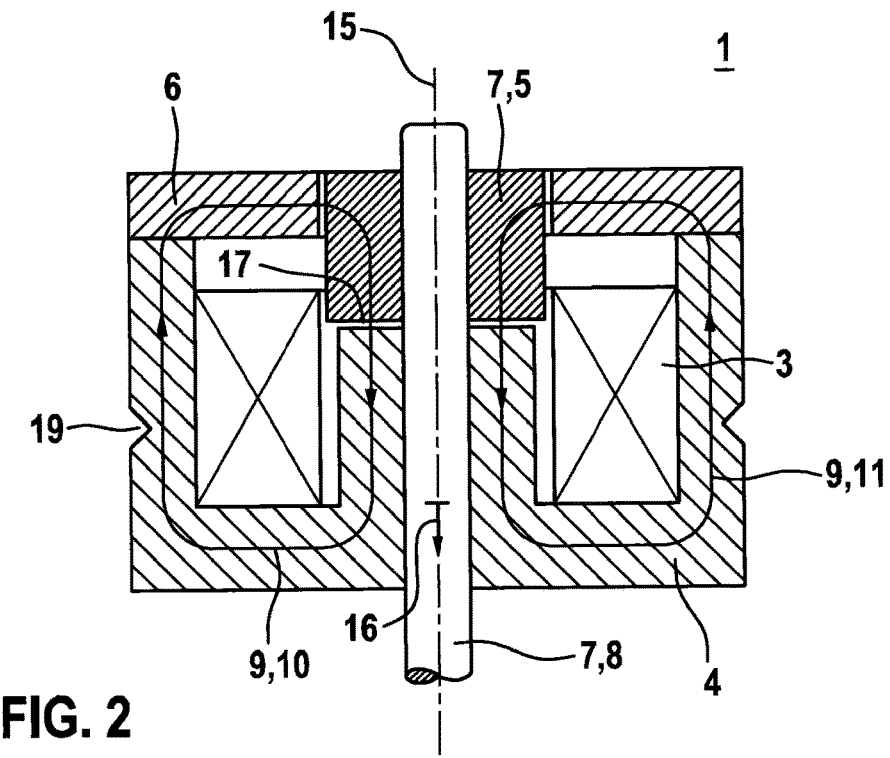
FIG. 2 shows a magnetic actuator corresponding to a second exemplary embodiment of the present invention in a schematic sectional representation.

FIG. 2 shows a magnetic actuator 1 corresponding to a second exemplary embodiment in a schematic sectional representation. In this exemplary embodiment, magnetic choke point 19 is formed by a recess 19 on ferromagnetic component 4. In this instance, magnetic choke point 19 is developed on ferromagnetic component 4 to be rotationally symmetrical with respect to axis 15. Recess 19 may be developed by laser machining. However, magnetic choke point 19 may also be developed by a chip-removing metal cutting method.

Figure 3:
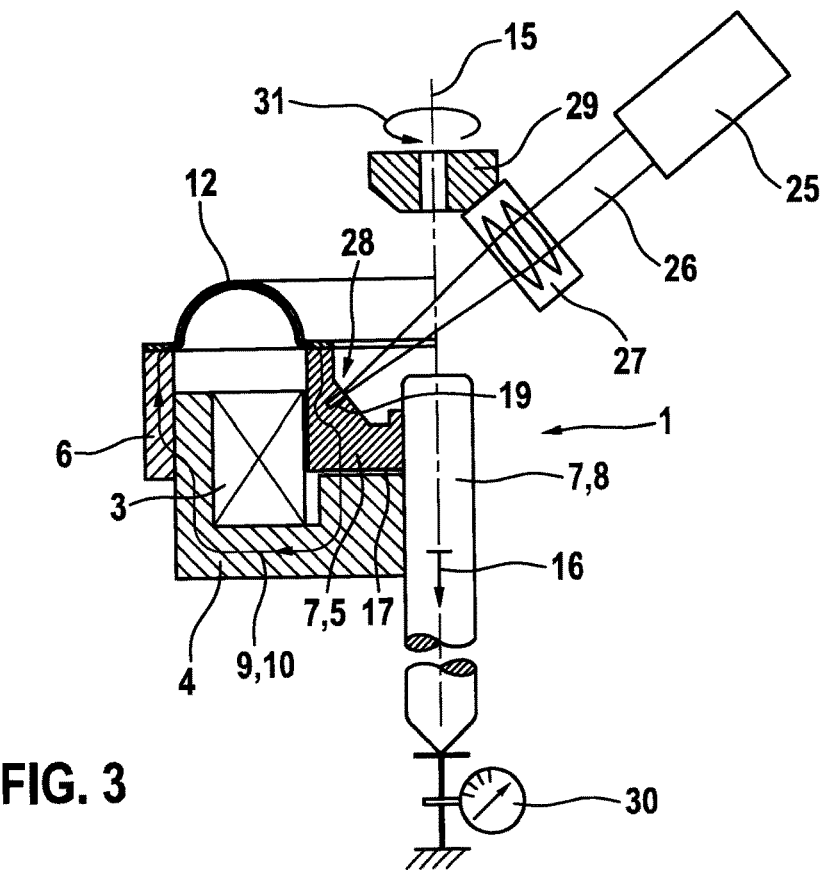
FIG. 3 shows a magnetic actuator corresponding to a third exemplary embodiment of the present invention in an excerpted, schematic sectional representation at a production step, to explain a method for producing the magnetic actuator.

FIG. 3 shows a magnetic actuator 1 corresponding to a third exemplary embodiment in an excerpted, schematic sectional representation at a production step, to explain a method for producing magnetic actuator 1. To carry out the method, a generator 25 is provided, which generates a laser beam 26. Laser beam 26 is focused via a converging lens 27 onto a machining point 28. Furthermore, an adjusting mechanism 29 is provided, which ensures that machining point 28 is changeable relative to magnetic actuator 1. In particular, machining point 28 may in this way be rotated about axis 15, as is illustrated by arrow 30.

In this exemplary embodiment, machining point 28 is directed onto ferromagnetic component 5 that is embodied as armature part 5. Magnetic choke point 19 is thus developed on armature part 5 in this exemplary embodiment.

In addition, magnetic choke point 19 is developed as recess 19 in ferromagnetic component 5 in this exemplary embodiment. Because of the rotation of machining point 28 about axis 15, magnetic choke point 19 is also embodied to be rotationally symmetrical.

Moreover, via a force-measuring device 30, which may particularly be embodied as force-measuring device 30, a magnetic attractive force may be measured when applying current to magnetic coil 3. This may be done iteratively or continuously during the machining of ferromagnetic component 5. If recess 19 is sufficiently large, so that the specified setpoint force for the magnetic attractive force has been reached, then this production step is terminated. Magnetic flux 9 is thereby adjusted.

In this exemplary embodiment, magnetic actuator 1 has an additional ferromagnetic component 12, which is developed as a diaphragm 12. Magnetic field line 10 is also guided via ferromagnetic component 12, in this instance Generator 25 produces laser beam 26, preferably as a pulsed laser beam 26.

Figure 4:
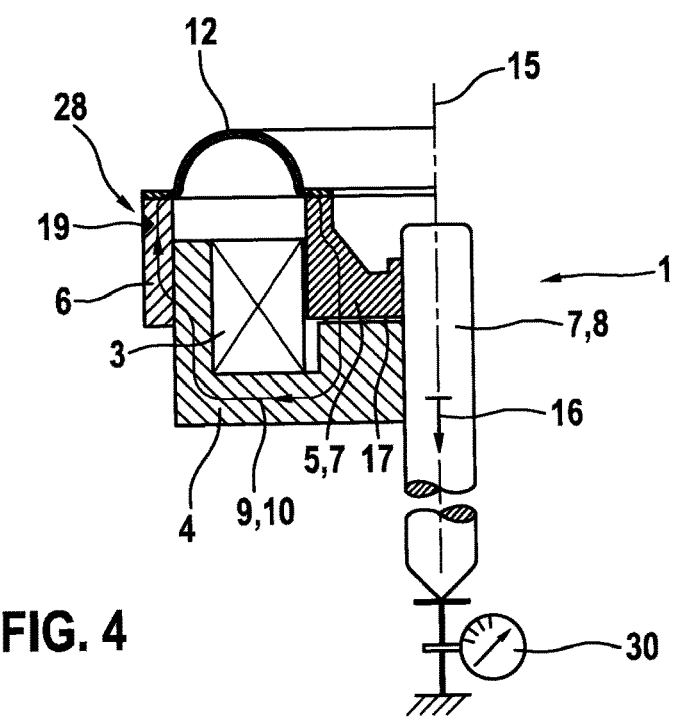
FIG. 4 shows a magnetic actuator corresponding to a fourth exemplary embodiment of the present invention, in an excerpted, schematic sectional representation at a production step, to explain a method for producing the magnetic actuator.

FIG. 4 shows a magnetic actuator 1 corresponding to a fourth exemplary embodiment in an excerpted, schematic sectional representation at a production step to explain a method for producing magnetic actuator 1 corresponding to a further embodiment. In this embodiment of the method, ferromagnetic component 6 is processed. In this case, ferromagnetic component 6 is processed at a processing point 28, whereby a welding seam 19 is developed which forms magnetic choke point 19. In this instance, welding seam 19 is preferably developed to be rotationally symmetrical with respect to axis 15 on ferromagnetic component 6. Magnetic flux 9 is influenced by way of bead on plate welding seam 19. The armature force generated at a certain current applied to magnetic coil 3 may be measured via force measuring device 30 in an iterative or continuous manner. Magnetic flux 9 is thereby able to be set to the setpoint magnetic flux. This occurs indirectly via the setting of the magnetic force acting upon armature 7 to a specified setpoint value for this magnetic force. Consequently, an adjustment of magnetic flux 9 with respect to the setpoint magnetic flux is possible at low production costs.

FIG. 5 shows a valve 2 used for metering in an exhaust-gas treatment, having a magnetic actuator 1 corresponding to a possible embodiment of the present invention, in an excerpted schematic sectional representation. In this instance, magnetic actuator 1 is located within a multi-part valve housing 35, which includes housing parts 36, 37. In this case, one or more magnetic choke points 19, 19' may be provided on magnetic actuator 1. Valve 2 may be used to meter urea for exhaust gas treatment, for instance.

Figure 6:
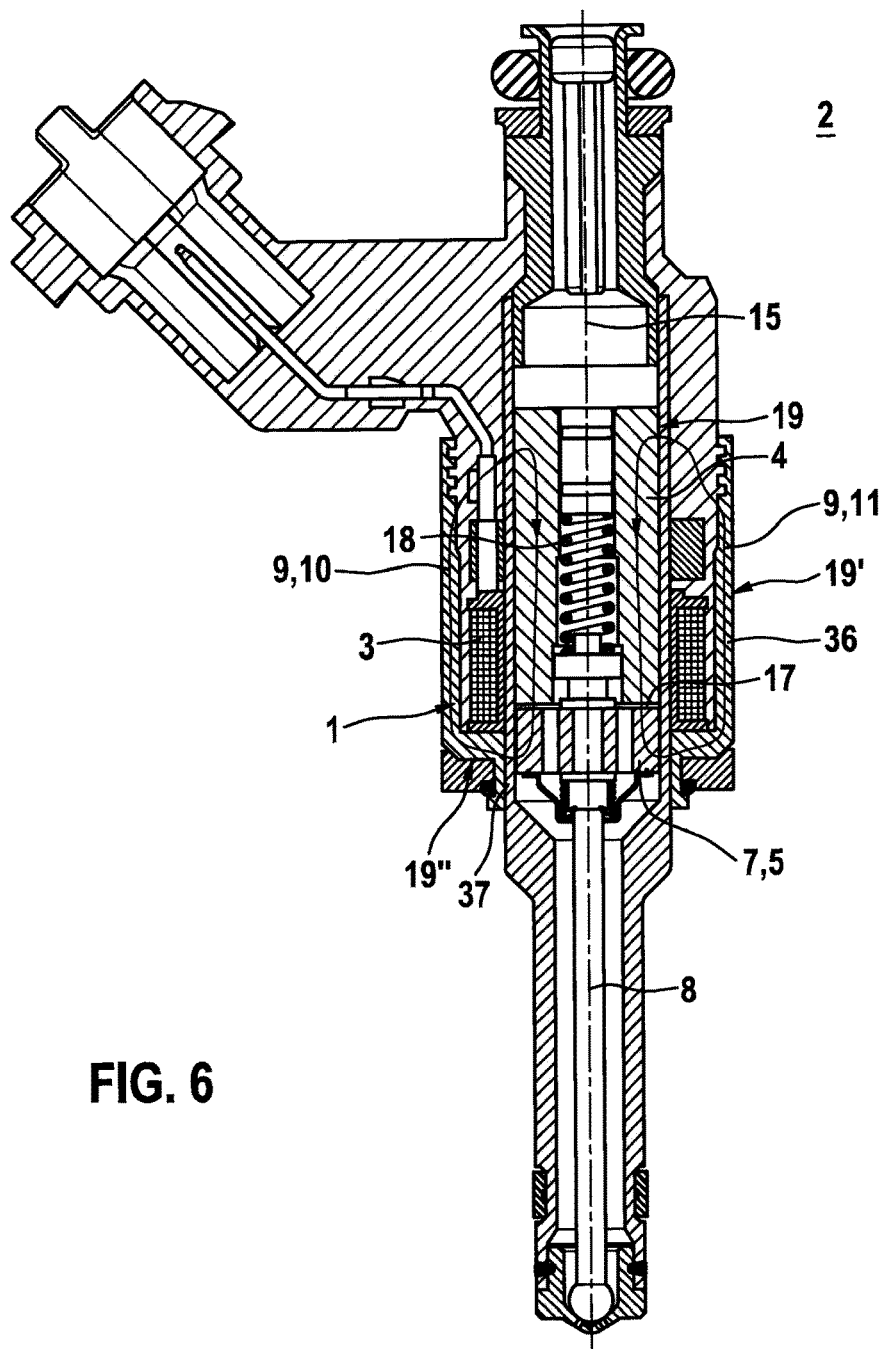
FIG. 6 shows a valve used for metering fuel, having a magnetic actuator corresponding to an additional possible embodiment of the present invention in an excerpted schematic sectional representation.

FIG. 6 shows a valve 2, used for metering fuel, having a magnetic actuator 1 corresponding to an additional possible embodiment of the present invention in an excerpted schematic sectional representation. Rod-shaped element 8 is developed as valve needle 8, in this instance. The valve has an housing part 36, 37. In this exemplary embodiment, housing parts 36, 37 of valve housing 35 of valve 2 are components of magnetic actuator 1, via which magnetic flux 9 is guided. To adjust the magnetic flux, a magnetic choke point may be developed on ferromagnetic component 4. In this exemplary embodiment, in addition or alternatively, choke points 19, 19" may also be developed on housing part 36 and/or on housing part 37, for adjusting magnetic flux 9.

The present invention is not restricted to the exemplary embodiments described.

What is claimed is:

1. A method for producing a magnetic actuator that includes a magnetic coil and at least one ferromagnetic component, via which a magnetic flux caused by the magnetic coil is able to be guided, the ferromagnetic component including an armature, the method comprising:
developing on the ferromagnetic component at least one magnetic choke point in such a way that the magnetic flux caused by the magnetic coil, which runs over the ferromagnetic component, is adjusted with respect to a setpoint magnetic flux, the developing including
(a) applying a current to the magnetic coil,
(b) during the applying, measuring a magnetic attractive force acting on the armature, and
(c) locally heating the ferromagnetic component, the at least one magnetic choke point being formed by a local microstructural transformation of a ferromagnetic material of the ferromagnetic component from the local heating,
wherein (a) and (b) are performed iteratively with (c) or continuously during (c), with a size of the transformed material increasing during the local heating, and wherein the heating is stopped when the measured magnetic attractive force reaches a specified setpoint force;
wherein the magnetic flux at the at least one magnetic choke point is increasingly diminished during the local heating.

2. The method as recited in claim 1, wherein the magnetic choke point is formed by an austenitic microstructure of the ferromagnetic material.

3. The method as recited in claim 1, wherein the ferromagnetic component includes an at least essentially rotationally symmetrical component; and the transformed material forming the magnetic choke point is rotationally symmetric on the ferromagnetic component.

4. The method as recited in claim 1, wherein the ferromagnetic component of the magnetic actuator is formed by a housing part of a valve housing.

5. The method as recited in claim 1, wherein the magnetic actuator is for a device of an internal combustion engine.

6. The method as recited in claim 1, wherein and (b) are performed iteratively with (c).

7. The method as recited in claim 1, wherein (a) and (b) are performed continuously during (c).

* * * * *